(12) United States Patent
Liu et al.

(10) Patent No.: US 12,309,350 B2
(45) Date of Patent: May 20, 2025

(54) PLAYER, PLAYING SYSTEM, AND PLAYING METHOD

(71) Applicant: Shenzhen Beihai ITS Communication Co. LTD, Guangdong (CN)

(72) Inventors: Hongde Liu, Guangdong (CN); Qing Chen, Guangdong (CN); Ying Chen, Guangdong (CN)

(73) Assignee: Shenzhen Beihai ITS Communication CO., LTD., Shenzhen (CN)

( * ) Notice: Subject to any disclaimer, the term of this patent is extended or adjusted under 35 U.S.C. 154(b) by 54 days.

(21) Appl. No.: 18/361,746

(22) Filed: Jul. 28, 2023

(65) Prior Publication Data

US 2025/0030828 A1     Jan. 23, 2025

(30) Foreign Application Priority Data

Jul. 18, 2023   (CN) .......................... 202310886057.5

(51) Int. Cl.
*H04N 13/302*     (2018.01)
*H04N 13/398*     (2018.01)

(52) U.S. Cl.
CPC ......... *H04N 13/302* (2018.05); *H04N 13/398* (2018.05)

(58) Field of Classification Search
CPC . H05B 33/10; G02B 1/11; Y10T 428/249953; Y10T 428/249961; Y10T 428/249969; Y10T 428/249978; Y10T 428/249986; Y10T 428/249988; G06F 3/041; G06F 3/04817; G06F 1/1601; G06F 1/1628; G06F 1/163; G06F 1/1652; G06F 1/1686; G06F 1/1688; G06F 1/169; G06F 1/3231
USPC ............................................................ 348/51
See application file for complete search history.

(56) References Cited

U.S. PATENT DOCUMENTS

2007/0054257 A1     3/2007   Apeles
2019/0305237 A1*   10/2019   Shin ....................... H10K 59/12

FOREIGN PATENT DOCUMENTS

CN        206370943 U       8/2017
EP         2972739 B1 *     8/2020   ............. G06F 3/041

* cited by examiner

*Primary Examiner* — Masum Billah

(57) ABSTRACT

The present application provides a player, a playing system, and a playing method. The player includes a main body, a control assembly, and an audio component, where the main body includes a light-transmitting element, a display screen with a reflection effect, and a display space, the display space being arranged between the display screen and the light-transmitting element. An object distance between the light-transmitting element and the display screen forms a front depth of field of an image, such that a viewer is given an impression that the image is displayed in a stereoscopic space; and the reflection of the display screen can effectively enhance the impression of the viewer that the stereoscopic image displayed by the display screen is stereoscopically displayed in the display space.

7 Claims, 5 Drawing Sheets

PLAYER, PLAYING SYSTEM, AND PLAYING METHOD

TECHNICAL FIELD

The present invention relates to the field of multimedia playing, in particular to a player, a playing system, and a playing method.

BACKGROUND

At present, there are mainly two types of 3D display. One is an auxiliary type, which requires wearing special glasses or helmets to meet binocular parallax so as to achieve 3D display effects. The other is a naked-eye type. The existing naked-eye type 3D display technology often uses a plurality of display screens to display different angles so as to achieve 3D display effects, but it has higher production costs and manufacturing difficulties, and a viewer needs to be located at a fixed angle of view or at a smaller angle of view (generally less than) 60° to have stereoscopic vision in the brain of the viewer who is unable to have the stereoscopic vision in the brain at a larger angle of view.

SUMMARY

Based on this, it is necessary to provide a player, to solve at least one of the above problems.

According to a first aspect, the present application provides a player, including:

- a main body, including a light-transmitting element, a display screen with a reflection effect, and a display space, where the light-transmitting element is arranged on an outer surface of one side of the main body, the display screen is arranged in one side, corresponding to the light-transmitting element, of the main body and is opposite to the light-transmitting element, and the display space is arranged between the display screen and the light-transmitting element;
- a control assembly, configured to control the display screen to play a video; and
- an audio component, configured to play sounds in the video.

Optionally, a mirror surface is arranged on one side, facing the light-transmitting element, of the display screen and is opposite to the light-transmitting element.

Optionally, the light-transmitting element is in a curved surface shape surrounding the display screen.

Optionally, the light-transmitting element is a light-transmitting plate.

Optionally, the display space is a cavity.

Optionally, the main body further includes a top wall and a bottom wall arranged oppositely, where the top wall and the bottom wall are located between the display screen and the light-transmitting element; and the display screen, the light-transmitting element, the top wall, and the bottom wall define the display space.

Optionally, the mirror surface of the display screen, a surface of the top wall that faces the display space, and a surface of the bottom wall that faces the display space are all black, the surface of the bottom wall that faces the display space is semi-circular, a periphery of the surface of the bottom wall that faces the display space has a semi-circular white edge, an image formed by reflection of the white edge through the mirror surface and the white edge jointly constitute a complete circle, the main body is cylindrical, and a section of the main body is circular.

Optionally, the control assembly includes a button and an interface, where the button is configured to control the player to be turned on or off, and the interface is configured to input the video.

According to the above player, due to the arrangement of the light-transmitting element and the display space, when a viewer observes an image in the display screen by the light-transmitting element, on the one hand, an object distance between the light-transmitting element and the display screen forms a front depth of field of the image, such that the viewer is given an impression that the image is displayed in a stereoscopic space; and on the other hand, due to the reflection of the display screen, the viewer can observe a reflection of the light-transmitting element in the display screen, and an image distance between the reflection of the light-transmitting element in the display screen and the display screen forms a rear depth of field of the image, such that due to the superposition of the front depth of field and the rear depth of field, the impression of the viewer that the stereoscopic image displayed by the display screen is stereoscopically displayed in the display space can be effectively enhanced.

According to a second aspect, the present application further provides a playing system for the player according to any one of the above embodiments, including a processor, a video input module, and a video playing module, where the processor is configured to obtain a playing instruction, control the video input module to obtain a video, and control the video playing module to play the video.

According to the above playing system, due to the use of the player including the light-transmitting element and the display space, when a viewer observes an image in the display screen by the light-transmitting element, on the one hand, an object distance between the light-transmitting element and the display screen forms a front depth of field of the image, such that the viewer is given an impression that the image is displayed in a stereoscopic space; and on the other hand, due to the reflection of the display screen, the viewer can observe a reflection of the light-transmitting element in the display screen, and an image distance between the reflection of the light-transmitting element in the display screen and the display screen forms a rear depth of field of the image, such that due to the superposition of the front depth of field and the rear depth of field, the impression of the viewer that the stereoscopic image displayed by the display screen is stereoscopically displayed in the display space can be effectively enhanced.

According to a third aspect, the present application further provides a playing method for the player according to any one of the above embodiments, including the following steps: obtaining a playing instruction; obtaining a video; and playing the video.

According to the above playing method, due to the use of the player including the light-transmitting element and the display space, when a viewer observes an image in the display screen by the light-transmitting element, on the one hand, an object distance between the light-transmitting element and the display screen forms a front depth of field of the image, such that the viewer is given an impression that the image is displayed in a stereoscopic space; and on the other hand, due to the reflection of the display screen, the viewer can observe a reflection of the light-transmitting element in the display screen, and an image distance between the reflection of the light-transmitting element in the display screen and the display screen forms a rear depth of field of the image, such that due to the superposition of the front depth of field and the rear depth of field, the impression of the viewer that the stereoscopic image displayed by the display screen is stereoscopically displayed in the display space can be effectively enhanced.

BRIEF DESCRIPTION OF THE DRAWINGS

The accompanying drawings are only for illustrative purposes and cannot be understood as a limitation on this patent; and the same reference numerals are used for components with the same structure and function. In the drawings.

Figure 1:
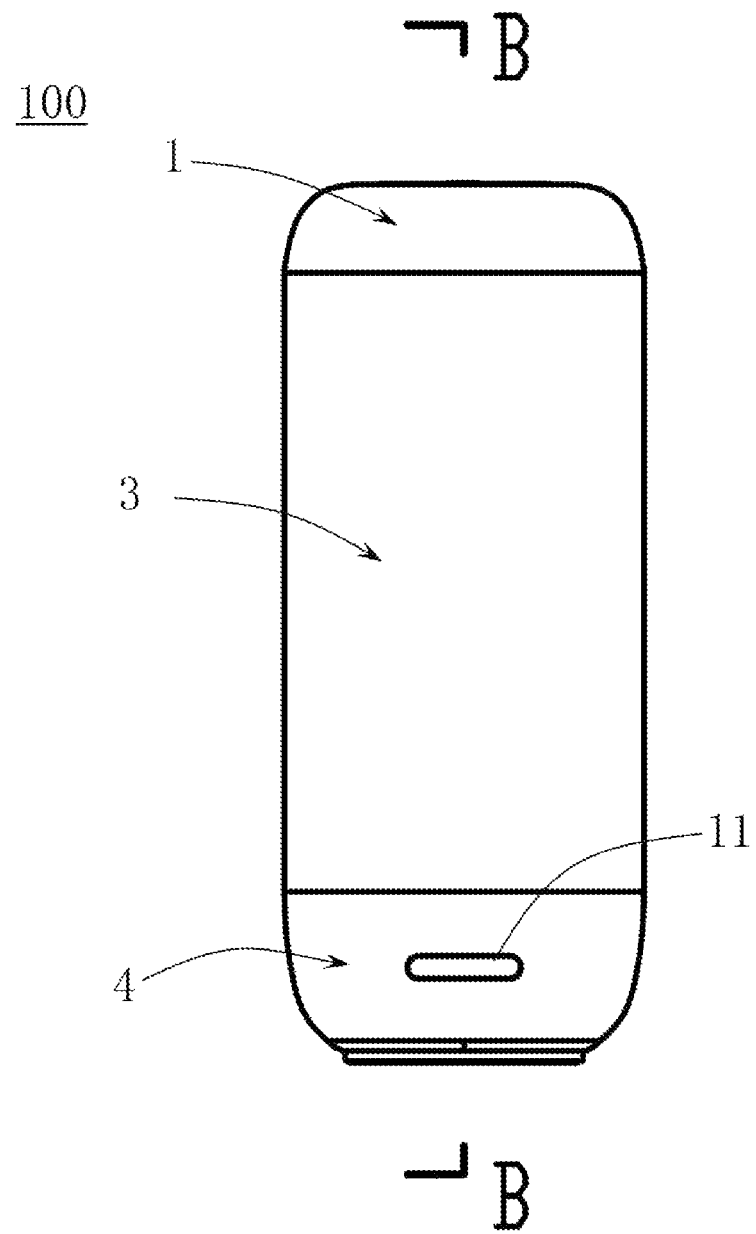
FIG. 1 is a schematic front view of a player according to an embodiment of the present application.

Description of reference numerals: control assembly—1; button—11; interface—12; processor—14; video input module—13; video playing module—15; indicator light—16; light-transmitting element—31; top wall—32; bottom wall—33; white edge—331; display space—34; display screen—35; mirror surface—351; mounting element—352; and audio component—4.

DETAILED DESCRIPTION OF THE EMBODIMENTS

The technical solutions in the embodiments of the present application will be described below with reference to the accompanying drawings in the embodiments of the present application. In the description of the embodiments of the present application, unless otherwise specified, "/" means or, for example, A/B may mean A or B; and "and/or" herein is merely intended to describe an association relationship of associated objects, indicating that three relationships may exist, for example, A and/or B may mean that only A, both A and B, or only B exists. In addition, in the description of the embodiments of the present application, "a plurality of" refers to two or more.

Hereinafter, the terms "first" and "second" are only for descriptive purposes, and cannot be construed as indicating or implying relative importance or implying the number of technical features indicated. Thus, the features defined with "first" and "second" may explicitly or implicitly include one or more of the features.

Figure 2:
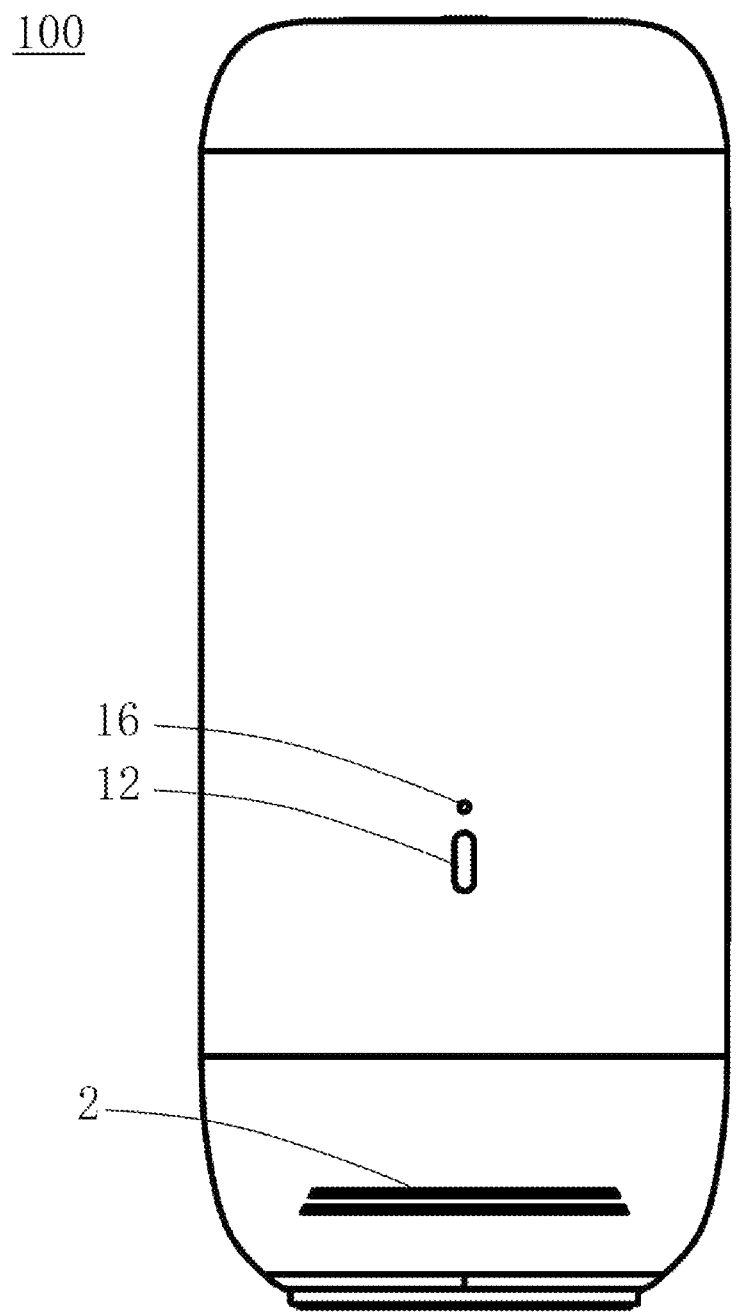
FIG. 2 is a schematic rear view of a player according to an embodiment of the present application.
Figure 3:
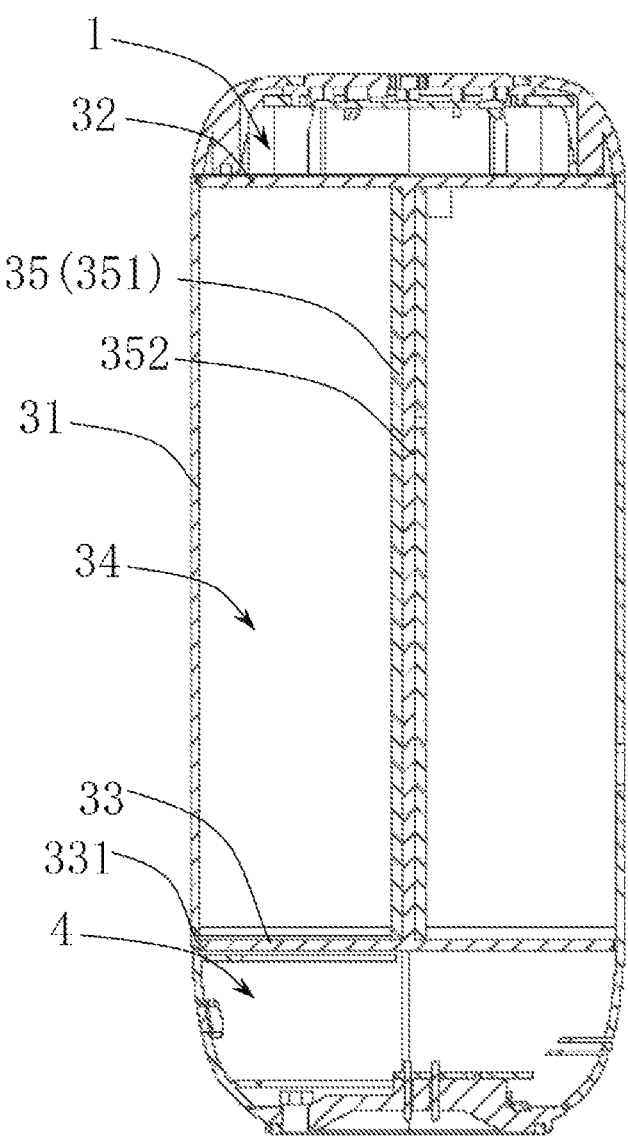
FIG. 3 is a schematic sectional view of the player in FIG. 1 along a section line B-B.
Figure 4:
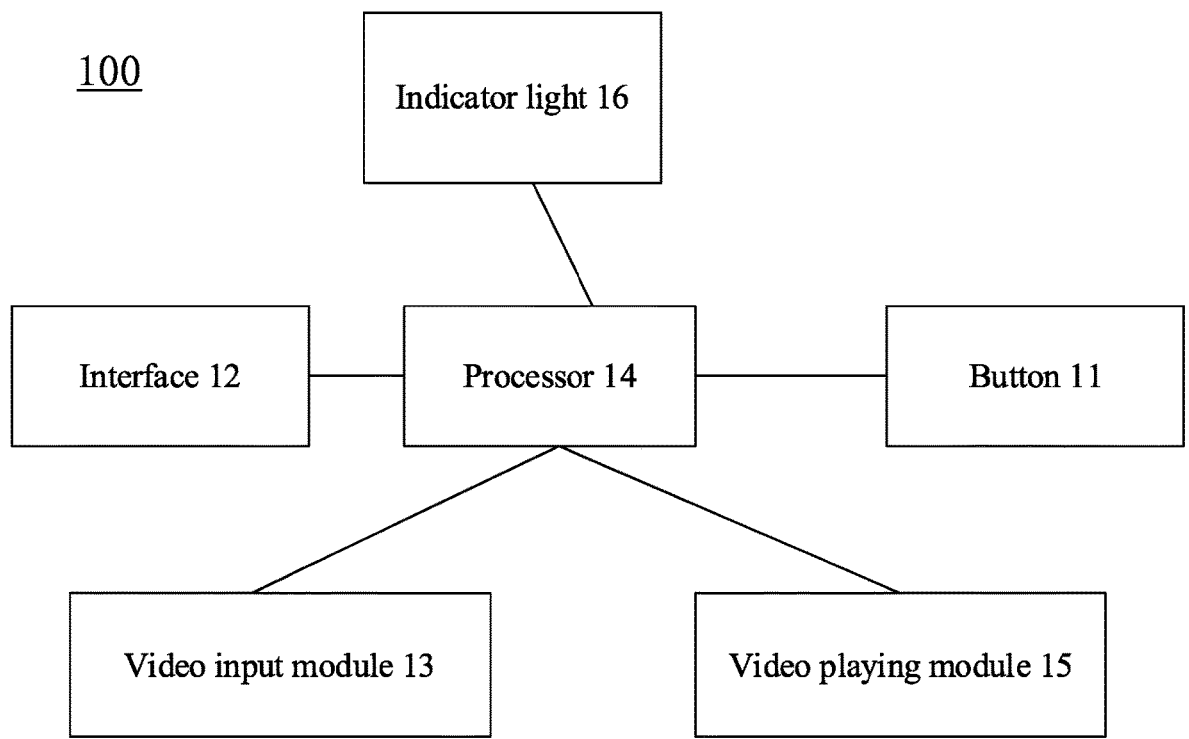
FIG. 4 is a schematic diagram of modules in a playing system according to an embodiment of the present application.
Figure 5:
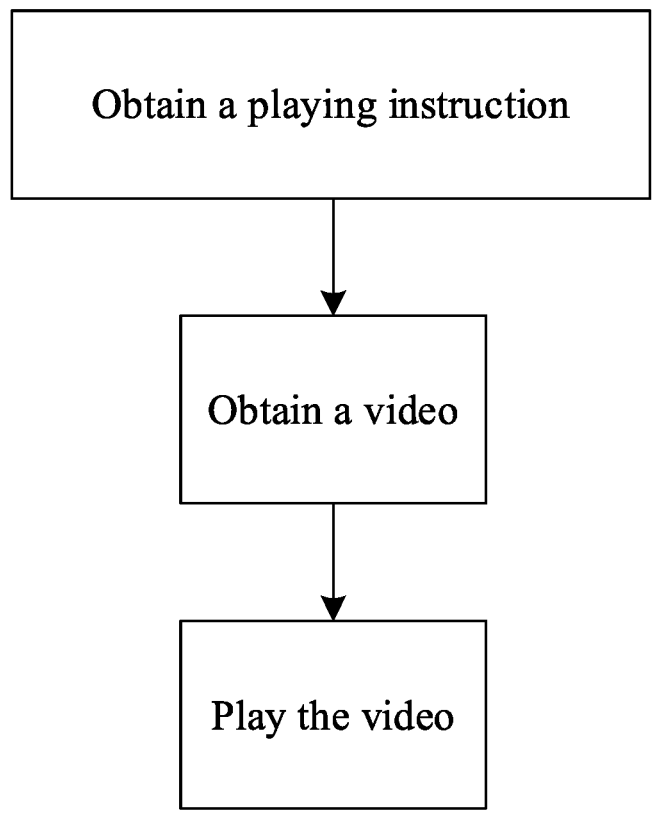
FIG. 5 is a schematic flowchart of a playing method according to an embodiment of the present application.

Referring to FIG. 1 to FIG. 3, in this embodiment, exemplarily, an embodiment of the present application provides a player, including:

a main body, including a light-transmitting element 31, a display screen 35 with a reflection effect, and a display space 34, where the light-transmitting element 31 is arranged on an outer surface of one side of the main body, the display screen 35 is arranged in one side, corresponding to the light-transmitting element 31, of the main body and is opposite to the light-transmitting element 31, and the display space 34 is arranged between the display screen 35 and the light-transmitting element 31;

a control assembly, configured to control the display screen 35 to play a video; and an audio component 4, configured to play sounds in the video.

Specifically, an object distance between the display screen 35 and the light-transmitting element 31 forms a front depth of field of a stereoscopic image; through the reflection of the display screen, a viewer can observe a reflection of the light-transmitting element in the display screen; and an image distance between the reflection of the light-transmitting element in the display screen and the display screen 35 forms a rear depth of field of the image.

Optionally, a mirror surface 351 is arranged on one side, facing the light-transmitting element 31, of the display screen 35 and is opposite to the light-transmitting element 31, such that the reflection effect of the display screen 35 can be enhanced.

Specifically, one side, deviating from the light-transmitting element 31, of the display screen 35 is mounted to a mounting element 352.

Specifically, the mounting element 352 is a mounting plate, namely, one side, deviating from the light-transmitting element 31, of the display screen 35 is mounted to the mounting plate.

Specifically, light emitted by the display screen 35 is reflected by the light-transmitting element 31 and then reflected again at the mirror surface 351, and a mirror image is formed at human eyes by the light-transmitting element 31.

Optionally, the light-transmitting element 31 is in a curved surface shape surrounding the display screen 35.

Optionally, the light-transmitting element 31 is a light-transmitting plate.

Optionally, the display space 34 is a cavity.

Optionally, the main body further includes a top wall 32 and a bottom wall 33 arranged oppositely, where the top wall 32 and the bottom wall 33 are located between the display screen 35 and the light-transmitting element 31; and the display screen 35, the light-transmitting element 31, the top wall 32, and the bottom wall 33 define the display space 34.

Optionally, the mirror surface 351 of the display screen 35, a surface of the top wall 32 that faces the display space 34, and a surface of the bottom wall 33 that faces the display space 34 have a same color. The mirror surface 351 of the display screen 35, the surface of the top wall 32 that faces the display space 34, and the surface of the bottom wall 33 that faces the display space 34 form their respective images at the mirror surface 351, and the images jointly constitute an image of the display space 34. In this way, when the viewer makes an observation, the viewer easily considers the display screen 35, the light-transmitting element 31, the top wall 32, and the bottom wall 33 as the integrated stereoscopic display space 34 on the one hand, and the viewer easily considers the display space 34 and the image of the display space 34 as an integrated stereoscopic space on the other hand, thereby further enhancing the impression of the viewer that the stereoscopic image displayed by the display screen 35 is stereoscopically displayed in the display space 34.

Optionally, the mirror surface 351 of the display screen 35, the surface of the top wall 32 that faces the display space 34, and the surface of the bottom wall 33 that faces the display space 34 are all black to form the display space 34 with a black background, the surface of the bottom wall 33 that faces the display space 34 is semi-circular, a periphery of the surface of the bottom wall 33 that faces the display space 34 has a semi-circular white edge 331, a semi-circular image formed by reflection of the white edge 331 through the mirror surface 351 and the white edge 331 jointly constitute a complete circle, the main body is cylindrical, and a section, intercepted from a plane where the bottom wall 33 is located, of the main body is circular. In this way, due to the arrangement of the white edge 331 as a reference object, when the viewer makes an observation from a front side, the contrast between the white edge 331 and the black background makes it easier for the viewer to notice the white edge 331, such that it is easy for the viewer to believe that the semi-circular image of the white edge 331 is behind the white edge 331, and the white edge 331 and the semi-circular image of the white edge 331 jointly constitute a complete circle. Moreover, due to the fact that a shape of the section, intercepted from the plane where the bottom wall 33 is located, of the main body is also a complete circle, the viewer can more easily consider the display space 34 and the image of the display space 34 as the integrated stereoscopic space.

It can be understood that in some embodiments, the section, intercepted from the plane where the bottom wall 33 is located, of the main body may also be in other shapes. In this case, the white edge 331 is set to have the same shape as the section, intercepted from the plane where the bottom wall 33 is located, of the main body.

Optionally, the control assembly 1 includes a button and an interface 12, where the button is configured to control the player to be turned on or off, and the interface 12 is configured to input the video.

Specifically, the control assembly 1 further includes an indicator light 16, where the indicator light 16 is configured to display a turn-on or turn-off state of the player.

According to the above player, due to the arrangement of the light-transmitting element 31 and the display space 34, when the viewer observes an image in the display screen 35 by the light-transmitting element 31, on the one hand, the object distance between the light-transmitting element 31 and the display screen 35 forms the front depth of field of the image, such that the viewer is given an impression that the image is displayed in the stereoscopic space; and on the other hand, due to the reflection of the display screen, the viewer can observe the reflection of the light-transmitting element 31 in the display screen, and the image distance between the reflection of the light-transmitting element 31 in the display screen and the display screen 35 forms the rear depth of field of the image, such that due to the superposition of the front depth of field and the rear depth of field, the impression of the viewer that the stereoscopic image displayed by the display screen 35 is stereoscopically displayed in the display space can be effectively enhanced.

In this embodiment, exemplarily, the present application further provides a playing system for the player according to any one of the above embodiments, including a processor 14, a video input module 13, and a video playing module 15, where the processor 14 is configured to obtain a playing instruction, control the video input module 13 to obtain a video, and control the video playing module 15 to play the video.

According to the above playing system, due to the use of the player including the light-transmitting element 31 and the display space 34, when the viewer observes an image in the display screen 35 by the light-transmitting element 31, on the one hand, the object distance between the light-transmitting element 31 and the display screen 35 forms the front depth of field of the image, such that the viewer is given an impression that the image is displayed in the stereoscopic space; and on the other hand, due to the reflection of the display screen, the viewer can observe the reflection of the light-transmitting element 31 in the display screen, and the image distance between the reflection of the light-transmitting element 31 in the display screen and the display screen 35 forms the rear depth of field of the image, such that due to the superposition of the front depth of field and the rear depth of field, the impression of the viewer that the stereoscopic image displayed by the display screen 35 is stereoscopically displayed in the display space can be effectively enhanced.

According to a third aspect, the present application further provides a playing method for the player according to any one of the above embodiments, including the following steps: obtaining a playing instruction; obtaining a video; and playing the video.

According to the above playing method, due to the use of the player including the light-transmitting element 31 and the display space 34, when the viewer observes an image in the display screen 35 by the light-transmitting element 31, on the one hand, the object distance between the light-transmitting element 31 and the display screen 35 forms the front depth of field of the image, such that the viewer is given an impression that the image is displayed in the stereoscopic space; and on the other hand, due to the reflection of the display screen, the viewer can observe the reflection of the light-transmitting element 31 in the display screen, and the image distance between the reflection of the light-transmitting element 31 in the display screen and the display screen 35 forms the rear depth of field of the image, such that due to the superposition of the front depth of field and the rear depth of field, the impression of the viewer that the stereoscopic image displayed by the display screen 35 is stereoscopically displayed in the display space can be effectively enhanced.

In the description of this embodiment, "a plurality of" means two or more, unless otherwise stated. The above contents are only specific embodiments of the present application, but the scope of protection of the present application is not limited thereto. Any changes or substitutions within the technical scope of the present application should all be included in the scope of protection of the present application. Therefore, the scope of protection of the present application should be subject to the scope of protection of the claims.

What is claimed is:

1. A player, comprising:
   a main body, comprising a light-transmitting element, a display screen with a reflection effect, and a display space, wherein the light-transmitting element is arranged on an outer surface of one side of the main body, the display screen is arranged in one side, corresponding to the light-transmitting element, of the main body and is opposite to the light-transmitting element, and the display space is arranged between the display screen and the light-transmitting element;
   a control assembly, configured to control the display screen to play a video; and
   an audio component, configured to play sounds in the video;
   wherein a mirror surface is arranged on one side, facing the light-transmitting element, of the display screen and is opposite to the light-transmitting element.

2. The player according to claim 1, wherein the light-transmitting element is in a curved surface shape surrounding the display screen.

3. The player according to claim 2, wherein the light-transmitting element is a light-transmitting plate.

4. The player according to claim 1, wherein the display space is a cavity.

5. The player according to claim 1, wherein the main body further comprises a top wall and a bottom wall arranged oppositely, the top wall and the bottom wall being located between the display screen and the light-transmitting element; and the display screen, the light-transmitting element, the top wall, and the bottom wall define the display space.

6. The player according to claim 1, wherein the mirror surface of the display screen, a surface of a top wall that faces the display space, and a surface of a bottom wall that faces the display space are all black, the surface of the bottom wall that faces the display space is semi-circular, a periphery of the surface of the bottom wall that faces the display space has a semi-circular white edge, an image formed by reflection of the white edge through the mirror surface and the white edge jointly constitute a complete circle, the main body is cylindrical, and a section of the main body is circular.

7. The player according to claim 1, wherein the control assembly comprises a button and an interface, the button being configured to control the player to be turned on or off, the interface being configured to input the video.

\* \* \* \* \*